US008148973B2

(12) United States Patent
Nishiguchi et al.

(10) Patent No.: US 8,148,973 B2
(45) Date of Patent: Apr. 3, 2012

(54) MAGNETIC RESOLVER (75) Inventors: Masayuki Nishiguchi, Toyota (JP); Yuji Sekitomi, Anjo (JP); Yoji Hamamoto, Toyoake (JP)

(73) Assignees: Toyota Jidosha Kabushiki Kaisha, Toyota-shi, Aichi-ken (JP); Matsuo Industries, Inc., Aichi Pref. (JP)

( * ) Notice: Subject to any disclaimer, the term of this patent is extended or adjusted under 35 U.S.C. 154(b) by 597 days.

(21) Appl. No.: 12/087,101

(22) PCT Filed: Dec. 22, 2006

(86) PCT No.: PCT/IB2006/003762
§ 371 (c)(1),
(2), (4) Date: Dec. 9, 2008

(87) PCT Pub. No.: WO2007/074375
PCT Pub. Date: Jul. 5, 2007

(65) Prior Publication Data
US 2009/0179632 A1   Jul. 16, 2009

(30) Foreign Application Priority Data

Dec. 26, 2005  (JP) ................................. 2005-372896
Jan. 18, 2006  (JP) ................................. 2006-010394

(51) Int. Cl.
    *G01B 7/30*    (2006.01)
(52) U.S. Cl. ................................................ 324/207.25
(58) Field of Classification Search .................... None
    See application file for complete search history.

(56) References Cited

U.S. PATENT DOCUMENTS

| 5,239,288 A | 8/1993 | Tsals |
| 5,903,205 A | 5/1999 | Goto et al. |
| 7,030,607 B2 * | 4/2006 | Ando et al. .............. 324/207.25 |

FOREIGN PATENT DOCUMENTS

| DE | 19 23 972 | 11/1970 |
| EP | 0 247 997 | 12/1987 |
| EP | 0 446 181 | 9/1991 |
| EP | 0 452 551 | 10/1991 |

(Continued)

OTHER PUBLICATIONS

Japanese Office Action issued Mar. 4, 2008, corresponding to JP 2006-111266.

(Continued)

*Primary Examiner* — Roberto Velez
(74) *Attorney, Agent, or Firm* — Finnegan, Henderson, Farabow, Garrett & Dunner, LLP (57) ABSTRACT A magnetic resolver includes: a plurality of columnar cores disposed on an annular plate; a coil portion disposed around each of the columnar cores; and an annular rotor having a sinusoidal profile that rotates in a plane parallel to the top faces of the columnar cores around a rotation axis that passes through the center of the annular plate. The coil portion may be formed of a patterned coil formed on an annular substrate that has a plurality of through holes made therein through which the plurality of cores are passed, the patterned coil being formed around the through hole.

17 Claims, 8 Drawing Sheets

FOREIGN PATENT DOCUMENTS

| | | |
|---|---|---|
| EP | 0 759 539 | 2/1997 |
| JP | 05-003921 | 1/1993 |
| JP | A-05-010779 | 1/1993 |
| JP | 06-311682 | 11/1994 |
| JP | 07-264786 | 10/1995 |
| JP | 09-53909 | 2/1997 |
| JP | P-3024972 | 1/2000 |
| JP | 2000-080557 | 3/2000 |
| JP | 2000-292120 | 10/2000 |
| JP | 2001-235307 | 8/2001 |
| JP | 2001-349749 | 12/2001 |
| JP | 2001-352734 | 12/2001 |
| JP | 2004-028319 | 1/2004 |
| JP | A-2004-101423 | 4/2004 |
| JP | 2004-342325 | 12/2004 |
| JP | A-2006-284255 | 10/2006 |

OTHER PUBLICATIONS

Japanese Office Action issued Jun. 10, 2008, corresponding to JP 2006-111266.
Japanese Office Action issued Jun. 16, 2009, corresponding to JP 2006-010394.
Japanese Office Action issued Jun. 16, 2009, corresponding to JP 2005-372896.
The First Office Action for Chinese Appl. No. 200680049370.8 dated Jul. 27, 2010.
Notification of Reason(s) for Refusal for JP Application No. 2006-010394 dated Oct. 5, 2010.
International Search Report.
Written Opinion of the ISR.

* cited by examiner

MAGNETIC RESOLVER

BACKGROUND OF THE INVENTION

1. Field of the Invention

The present invention relates to a magnetic resolver for detecting the rotation angle of a rotor.

2. Description of the Related Art

Conventional magnetic resolvers generally include a rotatable rotor core, a stator core, with two stator plates that sandwich the rotor core from above and below and that have convex, protruding poles arranged along the circumference of the stator core, and thin-film coils that are wound around the respective protruding poles of the stator core, and that detects a rotation angle of the rotor core by using the fact that the inductance of a coil varies with the rotation angle of the rotor core (see, Japanese Utility Model Application Publication No. 5-3921 ("JP-5-3921"), for example).

In a conventional resolver as described above, in which the film-shaped coils are used that are formed on a substrate in a pattern, it is possible to realize a thinner resolver body as compared to a conventional resolver in which wire is wound around the concave cores on a stator that are faced toward a rotor in the radial directions. In addition, it becomes unnecessary to wind wire to obtain coils. However, Japanese Utility Model Application Publication No. 5-3921 fails to disclose a specific configuration of a substrate on which the film-shaped coils are formed. If the substrates of the film-shaped coils are individually provided for the respective protruding poles, assembly is difficult. In addition, when the film-shaped coils are used, it is more difficult to easily increase the number of windings of the coil, as compared to a conventional resolver in which wire is wound around the cores on a stator that are faced toward a rotor in the radial direction.

In this type of variable reluctance (VR) resolver, what are important to efficiently enhance the resolution and accuracy of detecting the rotation angle are that the range of the variation of the magnetic resistance that accompanies the rotation of the rotor is large, and that the mode in which the magnetic resistance varies with the rotation of the rotor is smooth and stable. The mode in which the magnetic resistance varies with the rotation of t the rotor mainly depends on the configuration of the rotor core and the configuration of the protruding poles (including the relative relationship therebetween).

With this regard, although a specific configuration of the profile of the rotor core is described in JP 5-3921, none of the form of the protruding poles, the relationship between the form of the protruding poles and the form of the profile of the rotor core, and the positional relationship between the protruding poles and the periphery of the rotor core is disclosed. Accordingly, there is a lack of information to efficiently enhance the resolution and accuracy of detecting the rotation angle.

SUMMARY OF THE INVENTION

An object of the present invention is to provide a magnetic resolver that is easily assembled, and in which the number of windings of the coils can be increased without significantly increasing the thickness of the resolver. Another object of the present invention is to provide a magnetic resolver that enhances the resolution and accuracy of detecting a rotation angle.

A magnetic resolver according to a first aspect of the present invention includes: a plurality of columnar cores disposed on an annular plate; a coil disposed around each of the columnar cores; and an annular rotor having a sinusoidal profile line that rotates in a plane parallel to top faces of the columnar cores around a rotation axis that passes through the center of the annular plate.

A magnetic resolver according to a second aspect of the present invention includes: a stator portion that has a base portion having, on a side thereof, a plurality of protruding cores made of a magnetic material, a coil portion provided corresponding to each of the plurality of cores, and a rotor portion disposed so as to face the stator portion from above, wherein an area, by which a top face of the protruding core and the rotor portion overlap when viewed from above, varies as a rotation angle of the rotor portion relative to the stator portion varies, the coil portion is formed of a patterned coil formed on an annular substrate that has a plurality of through holes made therein through which the plurality of cores are passed, the patterned coil being formed around the through hole.

A third aspect of the present invention is similar to that of the second aspect, except that the base portion is constituted of an annular plate member, and the substrate on which the coil portions are formed is placed on the plate member with the core portions passed through the through holes. With the third aspect of the present invention, it is possible to assemble the resolver from one direction, so that the productivity is improved. In addition, it is possible to carry out positioning at the time of assembly by using the through holes and the protrusions, so that the accuracy of assembly is increased.

A fourth aspect of the present invention is similar to the second and third aspects described above, except that a plurality of the substrates on each of which the coil portions are formed are stacked. With the fourth aspect of the present invention, it is possible to increase the number of windings of the coils without significantly increasing the thickness of the magnetic resolver body.

A fifth aspect of the present invention is similar to the fourth aspect of the invention, except that the coil portions of a plurality of phases including an excitation phase are provided, and the coil portions of each phase are formed on separate substrates. With the fifth aspect of the present invention, even if multiple phases are used, it is easy to adjust each phase. In addition, it also becomes possible to use the substrate of each phase in a variation of the magnetic resolver, so that versatility is improved.

A sixth aspect of the present invention is similar to the fifth aspect of the present invention except that, a plurality of the substrates on each of which the coil portions of the same phase are formed are stacked, and the coil portions of the same phase on the plurality of substrates are electrically connected by using a via hole made in at least one of the plurality of substrates. With the sixth aspect of the present invention, it is possible to easily increase the number of windings of the coils that is required by each phase without overly impeding reduction in the thickness of the magnetic resolver body.

A magnetic resolver according to a seventh aspect of the present invention is similar to that of the first aspect, except that a radius of the rotor varies according to a sine function in which a rotation angle is a variable and a period is determined by an angular multiplication factor. With the seventh aspect of the present invention, it is possible to make the radius of the rotor vary in an appropriate manner relative to the top faces (circular faces) of the columnar cores.

A magnetic resolver according to a eighth aspect of the present invention is similar to that of the first or seventh aspect, except that the radial position of a profile-varying region that is a part of the rotor within a range of variation of the radius of the rotor corresponds to a radial position of the columnar core on the annular plate. With the eight aspect of the present invention, it is possible to maximize the range of the variation of the magnetic resistance that accompanies the rotation of the rotor.

A magnetic resolver according to a ninth aspect of the present invention is similar to that of the seventh or eighth aspect, except that the amplitude of the sine function is determined based on a radius r of the columnar core. With the ninth aspect of the present invention, it is possible to vary the radius of the rotor in a manner that is suitable in relation to the form of the columnar cores.

A magnetic resolver according to a tenth aspect of the present invention is similar to that of the ninth aspect, except that the amplitude of the sine function is substantially equal to the radius r of the columnar core, and a middle position of the profile-varying region is offset outward, in the radial direction, with respect to the central axis of the columnar core on the annular plate. With the tenth aspect of the present invention, because there is a gap between a minimum radius part of the rotor and the periphery of a core in a state where a rotational position is reached at which the minimum radius part of the rotor is the closest to the periphery of the core, it is possible to prevent the disturbance of the waveform of the voltage output from the coils that is caused at or near the rotational position due to the assembly error or the like.

A magnetic resolver according to a eleventh aspect of the present invention is similar to that of the tenth aspect, except that an amount of the offset is within a range of 0.3 to 1.2 mm in the radial direction. With the eleventh aspect of the present invention, because a gap of an appropriate size is created in the radial direction, it is possible to prevent the disturbance of the waveform of the voltage output from the coils that is caused when a rotational position is reached at which a minimum radius part of the rotor is the closest to the periphery of a core while maintaining, at a substantially maximum level, the range of the variation of the magnetic resistance that accompanies the rotation of the rotor.

A magnetic resolver according to a twelfth aspect of the present invention is similar to that of the ninth aspect, except that the middle position of the profile-varying region coincides with the central axis of the columnar core on the annular plate in the radial direction, and the amplitude of the sine function is within a range of 0.8 to 0.9 times the radius r of the columnar core. With the twelfth aspect of the present invention, it is possible to essentially eliminate the disturbance of the waveform of the voltage output from the coils that is caused at or near a rotational position at which a minimum radius part of the rotor is the closest to the periphery of a core, or at or near a rotational position at which a maximum radius part of the rotor is the closest to the periphery of a core, due to the assembly error or the like.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE INVENTION

An embodiment of the invention will be described below with reference to the drawings.

Figure 1:
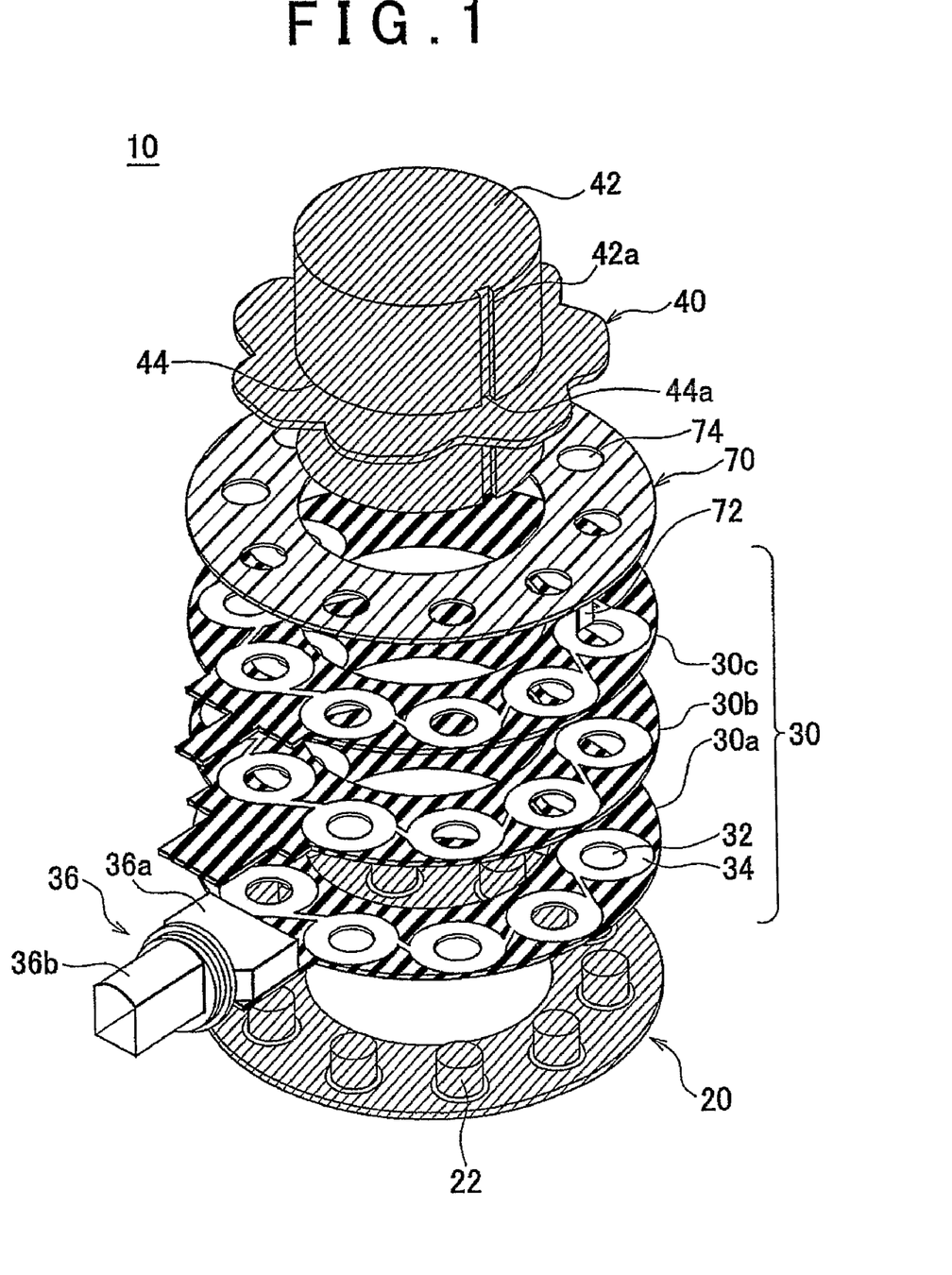
FIG. 1 is an exploded perspective view showing an embodiment of a magnetic resolver according to the present invention.

FIG. 1 is an exploded perspective view showing an embodiment of a magnetic resolver according to the present invention. In the description, the "above" direction does not mean the vertically upward direction in a state where the magnetic resolver is installed, but means the direction in which a rotor portion is present relative to a stator portion along the rotation axis, regardless of the orientation of the magnetic resolver once installed. In the description and the appended claims, the "radius" of the rotor means the distance between the reasonably determined center of the rotor and a point on the periphery of the rotor. Such a center includes the center of the mid-circle of the profile-varying region or the core-center pitch circle, which will be describe later, and the center of rotation of the rotor. In the embodiment described below, these centers coincide with each other.

The magnetic resolver 10 of this embodiment is a variable reluctance (VR) resolver, and, as shown in FIG. 1, includes: a base plate 20 on which core portions are formed; a substrate 30 (hereinafter referred to as "the coil substrate") on which coil portions are formed; and a rotor plate 40 constituting the rotor portion. As shown in FIG. 1, each of the base plate 20, the coil substrate 30, and the rotor plate 40 is formed in a disc-like shape to realize a thinner magnetic resolver 10. The base plate 20, the coil substrate 30 and the rotor plate 40 have substantially the same profile (substantially the same maximum diameter).

The base plate 20 is made of an iron-based magnetic material, and has an annular shape. The base plate 20 is typically formed of a lamination consisting of magnetic steel sheets (made of ferrosilicon, for example). The center of the annular shape of the base plate 20 is made to coincide with the center of a rotary shaft 42 of the rotor portion.

On the base plate 20, protruding cores 22 are formed. The cores 22 are made of an iron-based magnetic material (ferrosilicon, for example) as in the case of the base plate 20. The cores 22 may be integrally formed with the base plate 20 by machining or etching, for example, or otherwise may be formed by placing, on the base plate 20, columnar laminations that are formed separately.

Every core 22 has the same shape. In this embodiment, each core 22 is a columnar protrusion with a circular cross section having radius r. The cores 22 are regularly arranged on the annular base plate 20 along the circumference thereof. Specifically, the centers of the cores 22 (the centers of the circles) are located on the same radius circle with the rotary shaft 42 of the rotor portion centered, at evenly spaced angular positions. In the particular embodiment shown in the drawings, for example, ten cores 22 (ten poles) are formed at 36-degree intervals.

The coil substrate 30 is formed of an annular insulating substrate, and through holes 32 through which the cores 22 are passed are made in the coil substrate 30. Each through hole 32 has a circular shape corresponding to the shape of the core 22, and, more specifically, has a circular shape with a radius equal to or slightly greater than the radius of the core 22. The through holes 32 are regularly arranged in the annular coil substrate 30 along the circumference thereof. Specifically, the centers of the through holes 32 (the centers of the circles) are located on the same radius circle with the rotary shaft 42 of the rotor portion centered, at evenly spaced angular positions. In the embodiment shown in the drawings, ten through holes 32 (ten poles) are made at 36-degree intervals, corresponding to the cores 22.

A patterned coil 34 having a spiral shape is printed around each through hole 32. The patterned coils 34 are formed by printing an electrically conductive material, such as copper, on an insulating substrate. The patterned coils 34 are connected in series. The connection between the patterned coils 34 may be realized by printing connection lines (electrically conductive films) on the insulating substrate. In this case, the printing to connect the patterned coils 34 may be carried out concurrently with the printing of the patterned coils 34, so that it is possible to efficiently implement the formation of the patterned coils 34 and the electric connection therebetween on the coil substrate 30.

The protruding cores 22 are passed through the through holes 32 of the coil substrate 30 when the coil substrate 30 is placed on the base plate 20. In this way, around one through hole 32, the corresponding patterned coil 34 surrounding each pole forms the coil portion of the pole.

It is preferable to form the coil substrate 30 by stacking or laminating a plurality of insulating substrates on each of which the patterned coils 34 are printed. In this case, the patterned coils 34 of the same pole on the respective layers are electrically connected in series by via-holes. In this way, it is possible to efficiently provide the required number of windings of the coil for each pole without unnecessarily increasing the radial width of the annular coil substrate 30. For the sake of convenience in explanation, each of the plurality of insulating substrates constituting the coil substrate 30 is also referred to as the coil substrate.

The coil substrate 30 is provided with a connection portion 36. The connection portion 36 includes: a body portion 36a, which may be made of a thermoplastic insulator, such as polybutylene terephthalate (PBT), for example; and a connector terminal 36b, which may be made of brass, for example. The connection portion 36 is manufactured by insert injection molding using PBT and brass, for example. In the embodiment shown in the drawings, a protrusion protruding outward in the radial direction is formed on an insulating substrate constituting the coil substrate 30, and the body portion 36a of the connection portion 36 is joined to the protrusion. The patterned coils 34 connected in series on the coil substrate 30 is connected to an AC power source or a signal processor (a circuit for processing the voltage output from the coil portion), which is not shown, via a mating connector (not shown) to be connected to the connection portion 36, as described below.

It is preferable that the coil substrate 30 be provided for each of the phases (1-phase input/2-phase output, in this embodiment) individually. In the embodiment shown in the drawings, the coil substrate 30 that serves as excitation coils (hereinafter also referred to as "the excitation coil substrate 30a"), the coil substrate 30 that serves as coils for outputting a cosine-phase signal (hereinafter also referred to as "the cosine-phase coil substrate 30b"), and the coil substrate 30 that serves as coils for outputting a sine-phase signal (hereinafter also referred to as "the sine-phase coil substrate 30c") are provided as separate coil substrates. When the coil substrates 30 are separately formed for the respective phases in this way, it is possible to change the configuration of the patterned coils 34 of each phase (the adjustment or alteration to the number of windings, the winding direction or the like) without changing the coil substrate 30 of another phase, so that versatility is improved. In addition, it is possible to flexibly respond to the addition or change of the phases. Moreover, for the same reason, it is also possible to easily alter or adjust the overall characteristics of the coils of the respective phases by adding a coil substrate 30 on which patterned coils 34 to be used for adjustment are formed.

In this embodiment, the excitation coil substrate 30a is formed by stacking two layers of insulating substrates on each of which the patterned coils 34 are printed, and each of the cosine-phase coil substrate 30b and the sine-phase coil substrate 30c is formed by stacking six layers of insulating substrates on each of which the patterned coils 34 are printed. The number of windings and the winding direction of the patterned coils 34 of each pole on each of the coil substrates 30 of the respective phases are determined so that a desired sine-phase output and a cosine-phase output are induced as the rotor plate 40 rotates (that is, as the area of overlap between the core 22 and the rotor plate 40 varies with the rotation), as described below.

The coil substrates 30a, 30b and 30c of the respective phases, which are separately prepared for the respective phases, may be assembled by stacking the coil substrates 30a, 30b and 30c individually on the base plate 20, or otherwise may be assembled by bonding the coil substrates 30a, 30b and 30c together before placing the bonded substrates on the base plate 20. At this time, the cores 22 of the respective poles are passed through the through holes 32 of the corresponding poles that are made in the coil substrates 30a, 30b and 30c of the respective phases. Although, in the embodiment shown in the drawings, the excitation coil substrate 30a, the cosine-phase coil substrate 30b and the sine-phase coil substrate 30c are stacked on the base plate 20 in this order, the order in which the coil substrates 30a, 30b and 30c of the respective phases are stacked is arbitrary.

The coil substrates 30a, 30b and 30c of the respective phases may include their respective connection portions 36, or, as shown in FIG. 1, one of the coil substrates 30a, 30b and 30c may include the connection portion 36. In the latter case, it suffices that, by using the via-holes, a line be drawn out from the patterned coils 34 formed on another coil substrate, 30b for example, to the connection portion 36 on the coil substrate, 30a for example, that has the connection portion 36. In this case, the coil substrates 30a, 30b and 30c of the respective phases are bonded together, and the connection is established by using the via-holes. Thereafter, the resolver may be assembled by placing the coil substrates 30a, 30b and 30c on the base plate 20. The assembly performed after the coil substrates 30a, 30b and 30c are united in advance further improves the manufacturing efficiency and the assembly accuracy.

A cover 70 is placed on the top of the coil substrate 30 (the sine-phase coil substrate 30c in this embodiment) that is the uppermost one of the coil substrates stacked on the base plate 20 as described above. The cover 70 is manufactured by injection molding using resin material, such as PBT, and has an annular shape corresponding to the shape of the coil substrate 30. As in the case of the coil substrate 30, through holes 74, through which the cores 22 are passed, are formed in the cover 70. The through holes 74 have a circular shape corresponding to the shape of the cores 22. Specifically, the radius of the circular shape is equal to or slightly greater than the radius of the core 22. The through holes 74 are regularly arranged in the annular cover 70 along the circumference. Securing tabs 72 are formed on the outer edge of the cover 70. The securing tabs 72 are formed such that the tip portions thereof engage with (hook onto) the outer edge of the base plate 20.

The rotor plate 40 is made of a ferromagnetic material, and has an annular shape. The rotor plate 40 is typically formed of a lamination consisting of magnetic steel sheets (made of ferrosilicon, for example). The profile line of the rotor plate 40 does not have a fixed diameter, but is defined by the radius that periodically varies (the details of the profile line will be described later). N (N is an angular multiplication factor) that determines the periodic variation of the radius may be appropriately determined depending on the resolution required.

The rotor plate 40 is fixed to the rotary shaft 42. The rotary shaft 42 is a shaft of which the rotation angle is to be detected by the magnetic resolver 10, and may be an output shaft of a motor, for example. A locating protrusion 44a is formed on the periphery of a center hole 44 of the rotor plate 40, and a groove 42a corresponding to the protrusion 44a is cut in the outer circumferential surface of the rotary shaft 42 along the axial direction. The rotary shaft 42 is inserted into the rotor plate 40 in an angular relation such that the protrusion 44a fits in the groove 42a. In this way, the rotor plate 40 is held in a fixed position on the rotary shaft 42. It should be noted that the way in which the rotor plate 40 may be fixed to the rotary shaft 42 is arbitrary. A means for restricting the movement of the rotor plate 40 in the axial direction relative to the rotary shaft 42 may be additionally provided.

Figure 2:
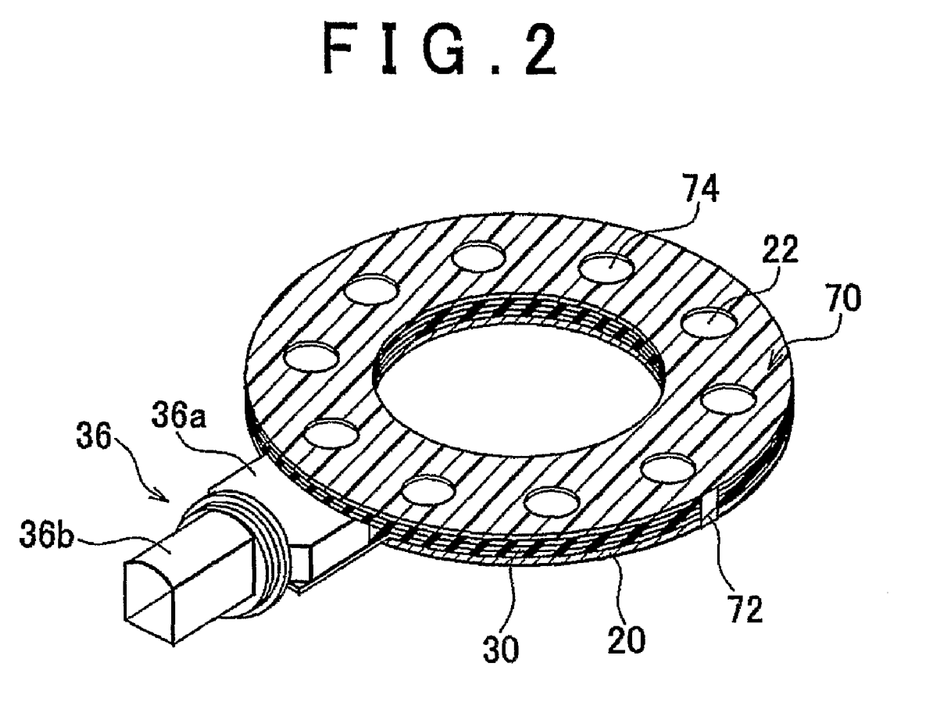
FIG. 2 is a perspective view showing an assembled magnetic resolver 10.

FIG. 2 is a perspective view showing an assembled magnetic resolver 10 (however, the rotor plate 40 is not present). As shown in FIG. 2, the coil substrates 30a, 30b and 30c of the respective phases stacked on the base plate 20 as described above are held in place with respect to the base plate 20 by the securing tabs 72 of the cover 70. In this way, an assembly is formed in which the base plate 20 and the coil substrates 30a, 30b and 30c of the respective phases are united. In this assembly, the patterned coils 34 of the respective poles on each of the coil substrates 30a, 30b and 30c of the respective phases form the coil portions of the respective poles of the corresponding phase, respectively. In addition, the tip portions (top faces) of the cores 22 of the respective poles are exposed from the cover 70 through the through holes 32 of the coil substrate 30 and the through holes 74 of the cover 70. The top faces of the cores 22 of the respective poles may be substantially flush with the top face of the cover 70.

Thus, according to this embodiment, the resolver may be assembled by stacking coil substrates 30a, 30b and 30c from one direction (from above), so that manufacturing is very easy. In addition, the cores 22 of the respective poles have a locating function in cooperation with the through holes 32 of the corresponding poles, so that it is possible to realize highly accurate assembly by performing easy assembly work without adjustment after the assembly. Because the coil portions equivalent to the windings wound around cores are obtained by stacking the coil substrates 30 on each of which the patterned coils 34 are printed, it becomes unnecessary to wind wire around cores. In addition, by stacking the base plate 20, the coil substrates 30a, 30b and 30c of the respective phases, and the cover 70 in a plate shape, it is possible to obtain a thinner assembly.

At the time of use, the rotary shaft 42 to which the rotor plate 40 has been attached is inserted into the center hole of the annular assembly. At this time, the rotor plate 40 faces the top faces of the cores 22 from above with a space therebetween. This is the state in which the magnetic resolver 10 can be used (that is, the state in which it is possible to detect an angle).

Figure 3:
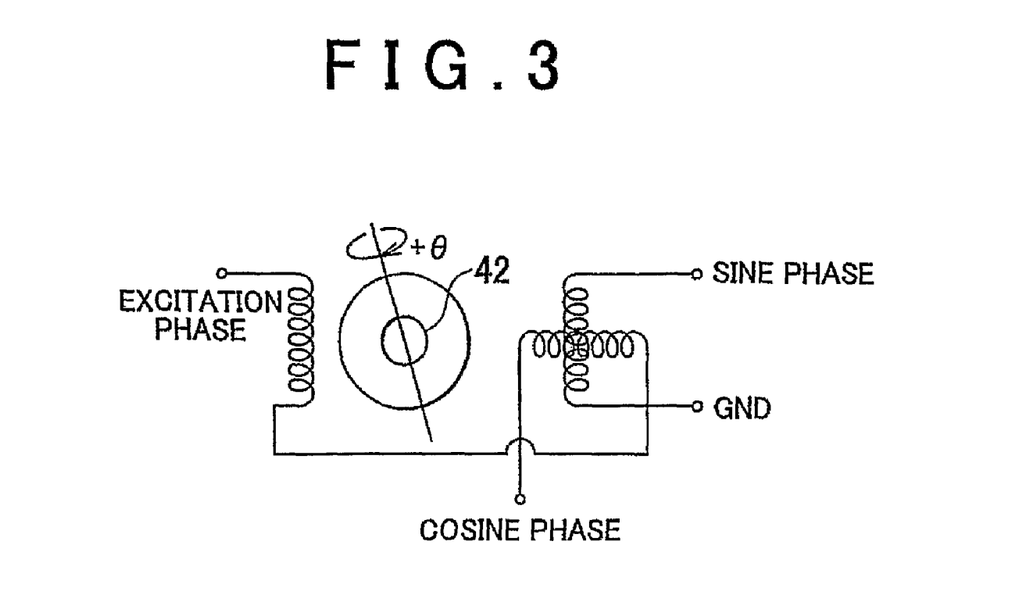
FIG. 3 shows an equivalent circuit of the magnetic resolver 10 of the embodiment.

FIG. 3 shows an equivalent circuit of the magnetic resolver 10 of this embodiment, which is formed as described above.

One end of the excitation coil (which means all of the patterned coils 34 that are connected in series on the excitation coil substrate 30a) formed on the excitation coil substrate 30a as described above is connected to a ground via the connector, and the other end thereof is connected to an AC power source via the connector. During operation, the AC power source applies an AC input voltage of 4 V, for example, across the excitation coil formed on the excitation coil substrate 30a.

One end of the sine-phase coil (which means all of the patterned coils 34 that are connected in series on the sine-phase coil substrate 30c) formed on the sine-phase coil substrate 30c as described above is connected to the ground via the connector, and the other end thereof is connected to a signal processor (not shown) via the connector. In this way, a sine-phase output voltage (induced voltage) is supplied to the signal processor mentioned above. In this embodiment, the sum of the voltages, each of which is induced across the corresponding one of the ten poles, is supplied as the sine-phase output voltage.

Similarly, one end of the cosine-phase coil (which means all of the patterned coils 34 that are connected in series on the cosine-phase coil substrate 30b) formed on the cosine-phase coil substrate 30b as described above is connected to the ground via the connector, and the other end thereof is connected to the signal processor (not shown) via the connector. In this way, a cosine-phase output voltage (induced voltage) is supplied to the signal processor mentioned above. In this embodiment, the sum of the voltages, each of which is induced across the corresponding one of the ten poles, is supplied as the cosine-phase output voltage.

The signal processor detects the rotation angle θ of the rotor plate 40 (the rotation angle θ of the rotary shaft 42) with the use of the following equation, based on the sine-phase output voltage and the cosine-phase output voltage:

$$\theta = 1/N \cdot \tan^{-1}(E_{COS\text{-}GND}/E_{SIN\text{-}GND})$$

where $E_{COS\text{-}GND}$ is the cosine-phase output voltage, and $E_{SIN\text{-}GND}$ is the sine-phase output voltage.

Figure 4:
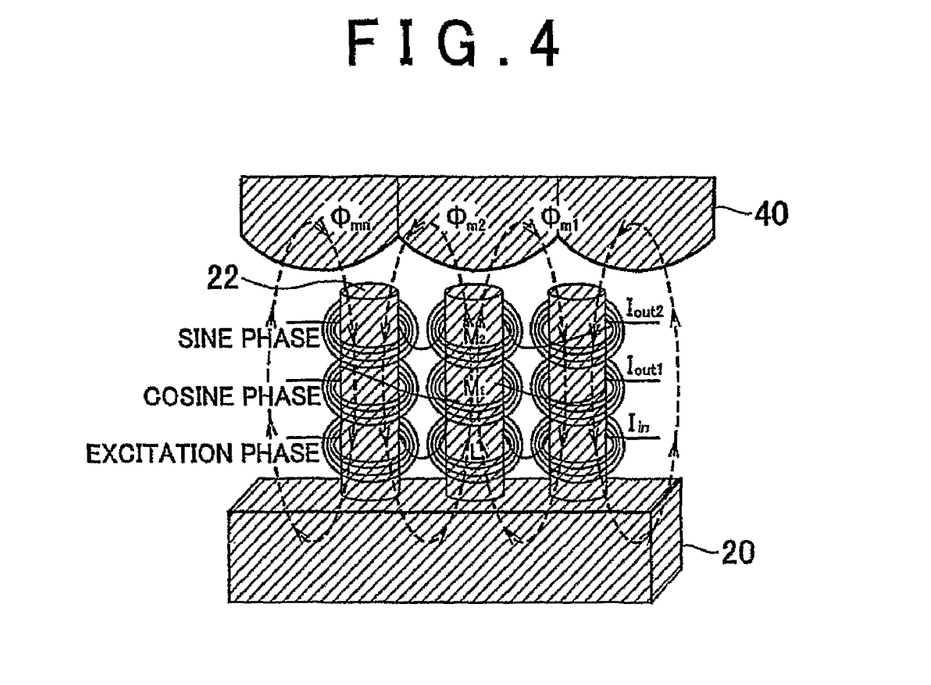
FIG. 4 is a drawing schematically showing the magnetic flux in the magnetic resolver 10 of the embodiment.

FIG. 4 is a diagram schematically showing the magnetic flux in the magnetic resolver 10 of this embodiment. FIG. 4 partially shows the magnetic flux formation in three poles. When the AC power source applies an excitation voltage to the excitation coil, a closed magnetic circuit is formed in each pair of the cores 22, which are two adjacent cores 22 having a cylindrical shape, as shown in FIG. 4. Specifically, in each pair, a closed magnetic circuit is formed that passes through one core 22, passes through the area of the rotor plate 40 from the region (overlap region) of the rotor 40 that overlaps the top face of this core 22 to the region (overlap region) of the rotor 40 that overlaps the top face of the other core 22, passes through the other core 22, passes through the other core 22, passes through the area of the base plate 20 between these two cores 22, and then returns to the one core 22. Because the base plate 20 is made of a magnetic material as described above in this embodiment, it is possible to form a magnetic path of which magnetic resistance is low as compared to the case where the base plate is made of a nonmagnetic material, such as an insulating material. In this way, the ratio of the output voltage to the input voltage (transformer ratio) becomes high, and, therefore, it is possible to enhance the resolution of detecting a rotation angle.

Figure 5A:
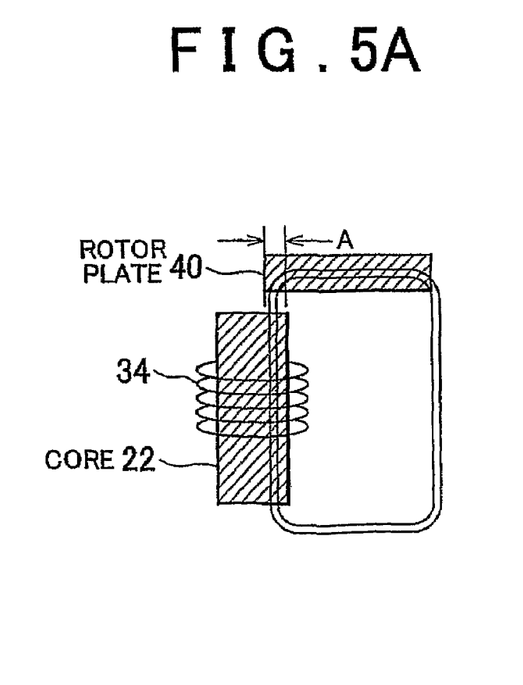
FIGS. 5A and 5B are diagrams schematically showing the mechanism of variation of magnetic resistance in the magnetic resolver 10 of the embodiment.
Figure 5B:
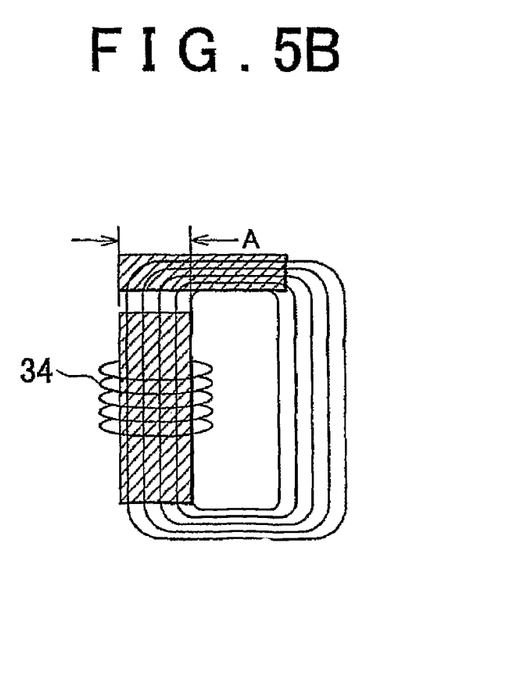

FIGS. 5A and 5B are diagrams schematically showing the mechanism of variation of magnetic resistance in the magnetic resolver 10 of this embodiment. FIGS. 5A and 5B partially show the magnetic flux formed in one pole. FIG. 5A shows the magnetic flux formed when the width A, or the area, of overlap between a peripheral portion of the rotor plate 40 and the top face of the core 22 is small. FIG. 5B shows the magnetic flux formed when the overlap width A is large. As shown in FIGS. 5A and 5B, when the width A of overlap between the peripheral portion of the rotor plate 40 and the top face of the core 22 varies, the width by which magnetic flux passing through the core 22 is blocked varies, which is accompanied by the variation of magnetic resistance. As a result, the voltage (output voltage) induced in the coil portion around the core 22 varies. The overlap width A varies as the outer diameter of the rotor plate 40 varies with the rotation of the rotary shaft 42. The magnetic resolver 10 of this embodiment detects the rotation angle of the rotor plate 40 (the rotation angle of the rotary shaft 42), using the variation of the magnetic resistance that accompanies the rotation of the rotor.

In this type of VR resolver, what are important to enhance the resolution and accuracy of detecting the rotation angle are that the range of the variation of the magnetic resistance that accompanies the rotation of the rotor is large, and that the mode in which the magnetic resistance varies with the rotation of the rotor is not affected by the individual differences; that is, the rotation is stable.

A configuration that makes it possible to enhance the resolution and accuracy of detecting the rotation angle will be described below.

Figure 6:
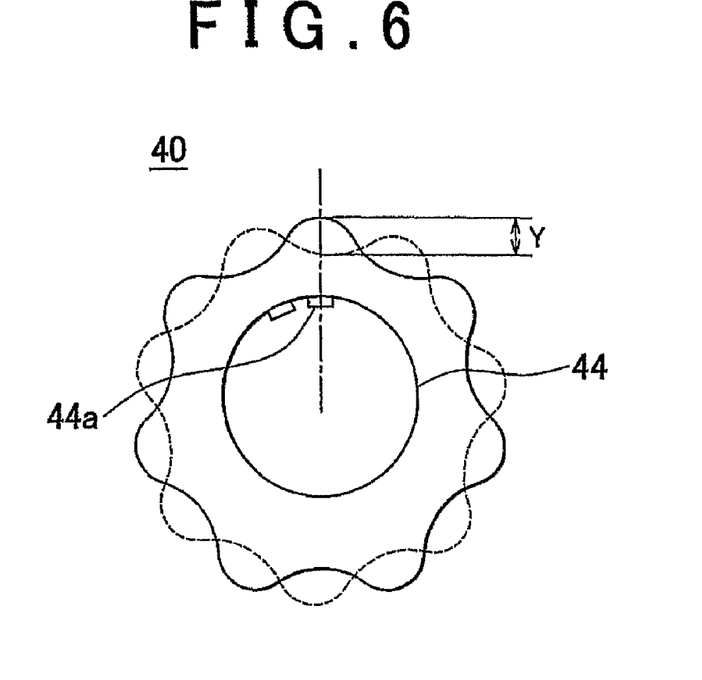
FIG. 6 is a plan view of the rotor plate 40.

FIG. 6 is a plan view of the rotor plate 40. In FIG. 6, a state of the rotor plate 40 brought about when the rotor plate 40 is rotated by an angle (180°/N) that is half of the angular interval (360°/N) of the periodic variation of the profile line, is shown by a dashed line.

The function Y that expresses the profile line (outline) of the rotor plate 40 will now be described. First, imagine an arbitrary reference axis extending in a radial direction passing through the center of rotation of the rotor plate 40 (the rotary shaft 42). The reference axis herein is the chain line shown in FIG. 6. In FIG. 6, the state of the rotor plate 40 brought about when the maximum radius part of the rotor plate 40 is positioned on the reference axis is shown by the solid line, and the state of the rotor plate 40 brought about when the minimum radius part of the rotor plate 40 is positioned on the reference axis is shown by the dashed line. Assuming that the angular multiplication factor of the rotor plate 40 is N, the maximum radius and the minimum radius of the rotor plate 40 periodically appear on the reference axis every time the rotation angle of the rotor plate 40 varies by 180°/N.

As shown in FIG. 6, the function Y represents the position of the point on the profile line of the rotor plate 40 on the reference axis at the rotation angle θ when the outermost position of the minimum radius part of the rotor plate 40 on the reference axis is defined as the origin. Specifically, the function Y represents the difference between the radius of the rotor plate 40 at the rotation angle θ and the minimum radius thereof on the reference axis. In other words, the function Y shows the aspect in which the position of the point on the profile line of the rotor plate 40 on the reference axis varies.

In the first embodiment, the function Y is represented as follows:

$$Y = a\{\sin N(\theta - 90°/N) + 1\}$$

wherein N is the angular multiplication factor, and r (mm) is the radius of the core 22 as described above and a is the amplitude. The amplitude a may be equal to the radius r of the core 22. In this case, as apparent from this equation, the position of the point on the profile line of the rotor plate 40 on the reference axis varies according to the sine curve of which the amplitude is r as the rotation angle θ varies. Thus, the range of variation 2r of the profile line of the rotor plate 40 in the radial direction is equal to the diameter 2r of the core 22. When the resolver is of 7×, that is, N=7, and r=4 [m], for example, the function Y is represented as follows:

$$Y = 4\{\sin 7(\theta - 90°/7) + 1\}$$

For the sake of convenience in explanation, an example in which the amplitude a is equal to the radius r will be described below. The region of the rotor plate 40 between the maximum radius and the minimum radius thereof (the region of which the width in the radial direction is 2r) is referred to as "the profile-varying region," and the circle of which the radius is equal to the minimum radius+r is referred to as "the mid-circle of the profile-varying region."

In this embodiment, the relationship between the rotor plate 40 and the cores 22 is set so that the profile-varying region, which is the peripheral part of the rotor plate 40, faces the cores 22 from above, and the profile-varying region can overlap the top faces of the cores 22 when viewed from above, and so that the mid-circle of the profile-varying region substantially coincides with the circle (hereinafter referred to as "the core-center pitch circle") that passes through the centers of the cores 22 of the respective poles. The region in the profile-varying region that overlaps the circular region (projective circle of the core) of the top face of a core 22 when viewed from above is hereinafter referred to as "the overlap region."

When the positional relationship between the rotor plate 40 and the core 22 as described above is adopted, the width of the overlap region in the radial direction (hereinafter referred to as "the overlap width") varies with the amplitude of approximately 2r as the rotor plate 40 rotates, owing to the shape of the profile line of the rotor plate 40 described above. It should be noted that, if the mid-circle of the profile-varying region completely coincides with the core-center pitch circle when viewed from above, the overlap width varies with the amplitude of 2r. The overlap width determines the size of the area of the overlap region (hereinafter referred to as "the area of overlap"). Specifically, the larger the amplitude of the overlap width (the range of variation) is during the rotation of the rotor plate 40, the larger the amplitude of the area of overlap (the range of variation) becomes.

Figure 7:
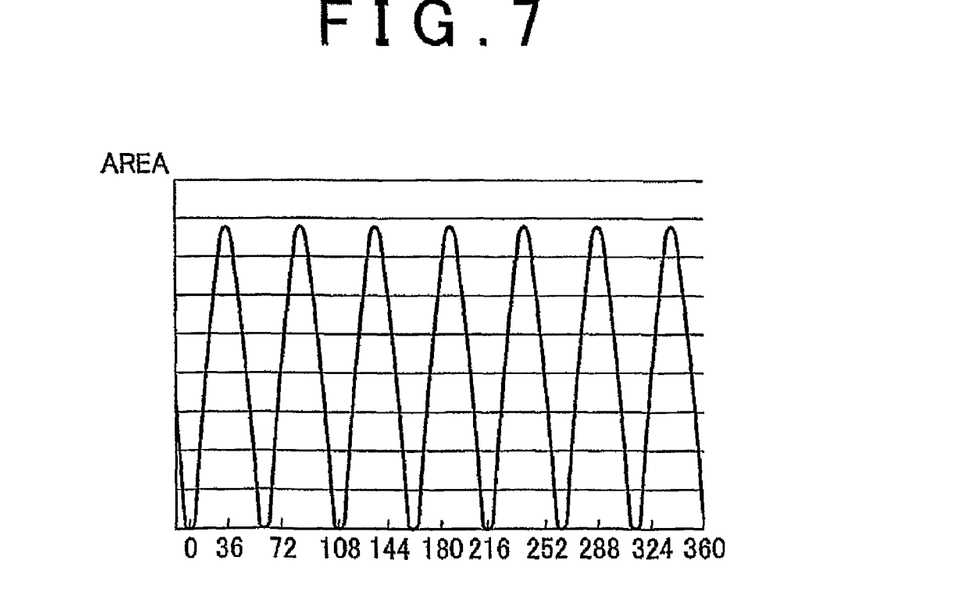
FIG. 7 is a diagram showing the manner in which the area of overlap varies as the rotor plate 40 rotates.
Figure 8:
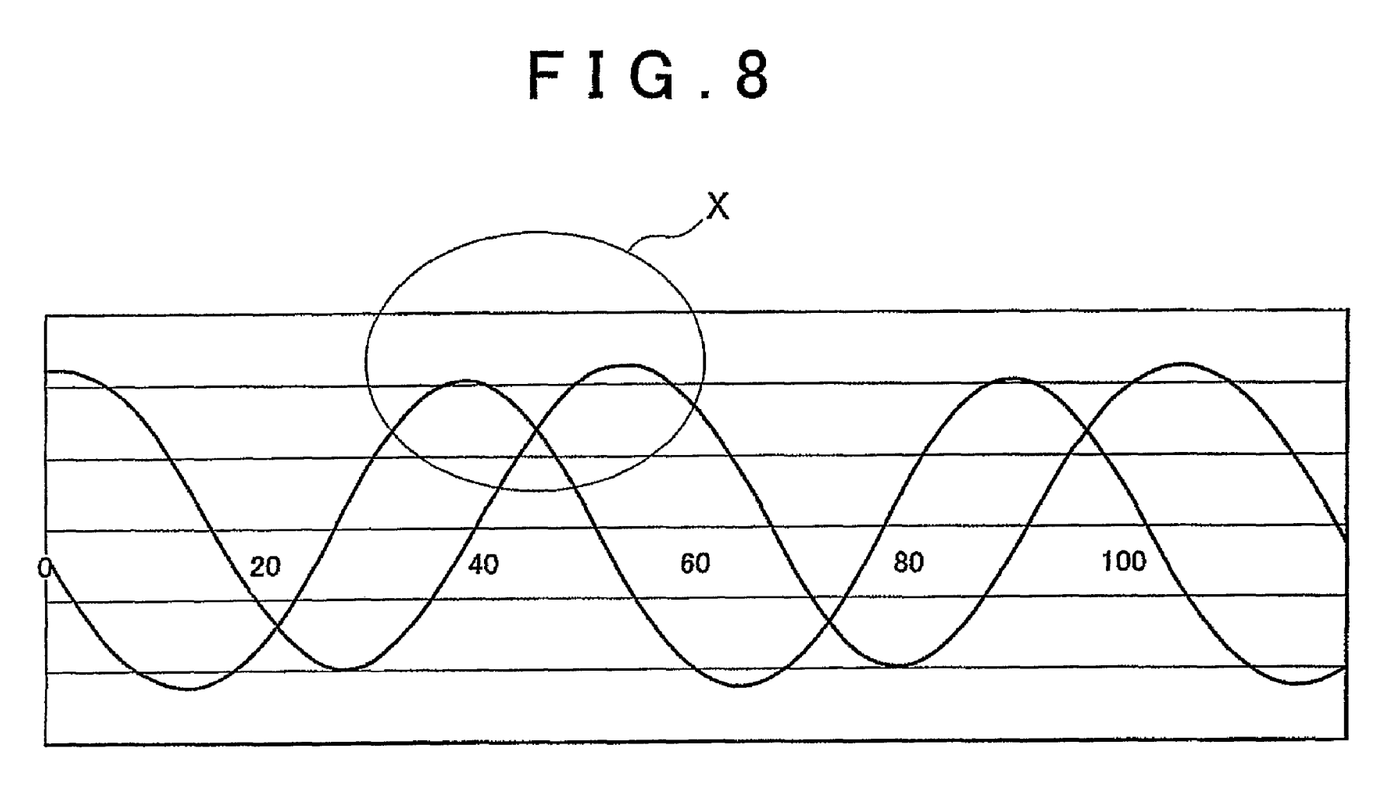
FIG. 8 is a diagram showing waveforms of the voltages output from a sine-phase coil and a cosine-phase coil while the rotor plate 40 rotates.

FIG. 7 shows the manner in which the area of overlap varies as the rotor plate 40 rotates. FIG. 8 shows waveforms of the voltages output from the sine-phase coil and the cosine-phase coil while the rotor plate 40 rotates.

In this embodiment, the angular multiplication factor N is 7, and, therefore, the area of overlap sinusoidally varies with a period of $2\pi/7$ (rad) while the rotor plate 40 rotates. Similarly, the voltages output from the sine-phase coil and the cosine-phase coil sinusoidally vary with a period of $2\pi/7$ (rad) with the respective phases shifted from each other by $\pi/2$ as the rotation angle θ of the rotor plate 40 varies.

Because the variation of the area of overlap causes the variation of the magnetic resistance as described in relation to FIG. 5, the larger the range of variation of the area of overlap is during the rotation of the rotor plate 40, the larger the range of variation of the magnetic resistance becomes during the rotation of the rotor plate 40. Concurrently, the range (the amplitude of the sine curve) with which the voltages output from the coils of the respective phases (the sine-phase coil and the cosine-phase coil) vary during the rotation of the rotor plate 40 becomes large.

In this embodiment, because a positional relationship in which the mid-circle of the profile-varying region and the core-center pitch circle substantially coincide with each other, the overlap width varies with an amplitude of substantially 2r corresponding to the diameter 2r of the core 22 as described above. Accordingly, this embodiment makes it possible to obtain the variation of the voltages output from the coils that is required to perform angle detection at the highest level that can be expected when the cores 22 with a certain diameter are used. In this way, it is made possible to enhance the resolution of detecting the rotation angle, and, therefore, the detection accuracy is improved. By contrast, if the range of variation of the profile line of the rotor plate 40 in the radial direction is significantly larger than 2r, the rate of change in the area of overlap relative to the variation of the rotation angle becomes small (the angular range occurs in which there is no variation of the degree to which the rotor plate 40 allows the magnetic flux to pass therethrough). For this reason, it becomes difficult to enhance the resolution and accuracy of detecting the rotation angle.

Figure 9A:
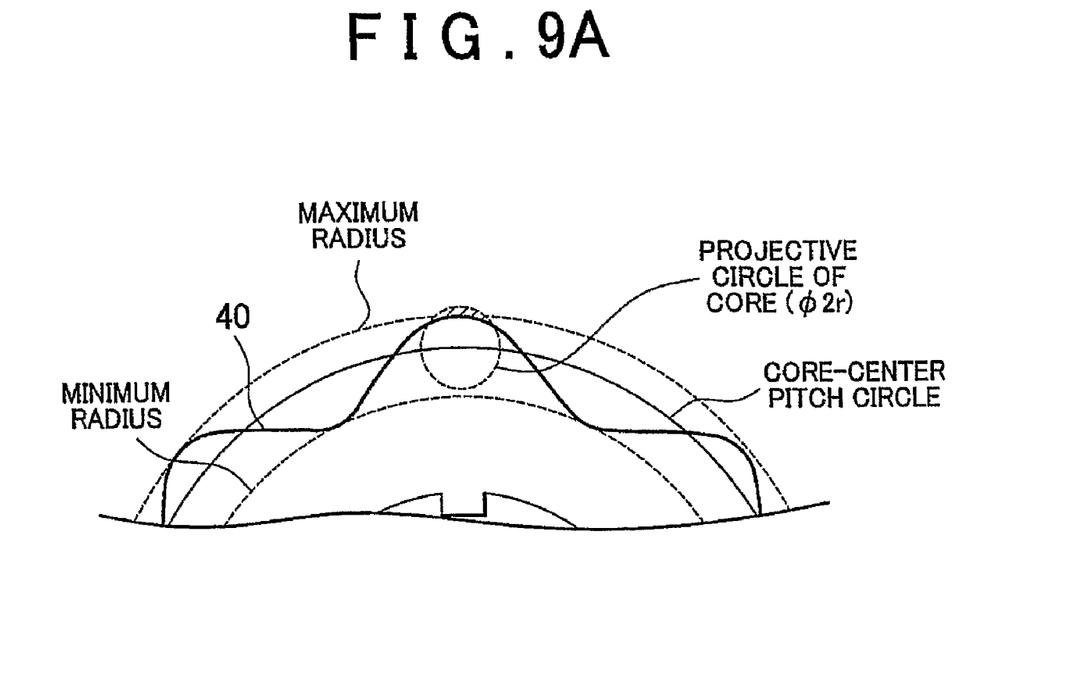
FIGS. 9A and 9B are plan views for explaining a gap.
Figure 9B:
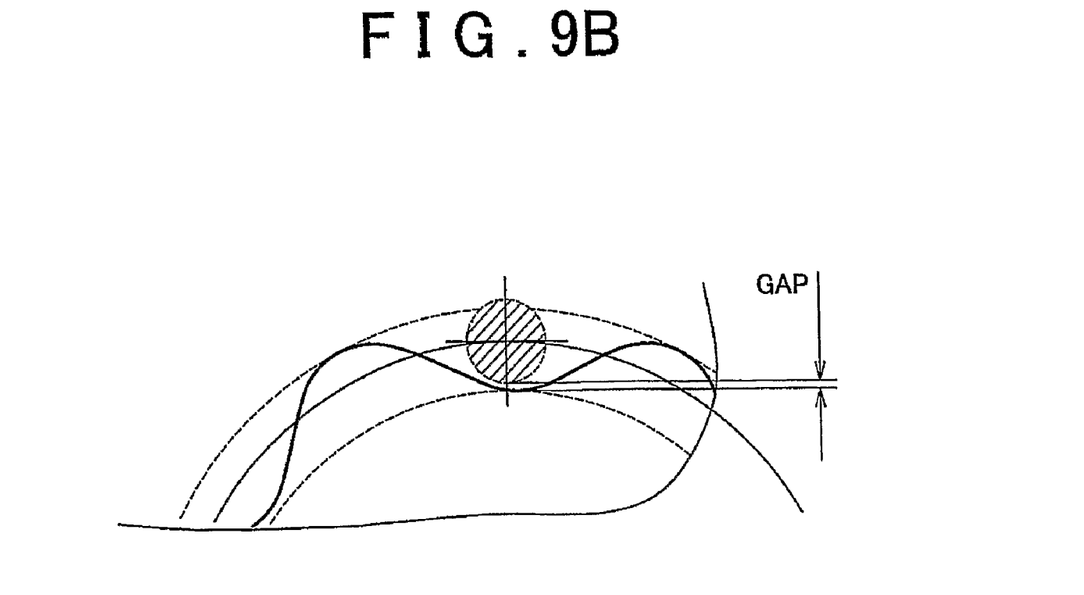

FIGS. 9A and 9B are diagrams showing a more preferable positional relationship between the rotor plate 40 and the core 22, and are partial views in which attention is focused on a core 22 of a pole (the explanation of FIGS. 9A and 9B is given with attention focused on the single core 22). FIG. 9A shows a state in which the maximum extent of coverage of the top face of the core 22 is covered by the profile-varying region. FIG. 9B shows a state that is realized when the rotor plate 40 rotates 180°/N relative to the rotational position shown in FIG. 9A. In FIGS. 9A and 9B, the solid line represents the core-center pitch circle, and the dotted lines show the maximum and minimum radii of the rotor plate 40 (the trajectories thereof drawn when the rotor rotates).

In the example shown in FIGS. 9A and 9B, the mid-circle of the profile-varying region does not completely coincide with the core-center pitch circle, and the radius of the mid-circle of the profile-varying region is slightly smaller than the radius of the core-center pitch circle. Accordingly, the difference between the radius of the core-center pitch circle and the minimum radius of the rotor plate 40 increases by the corresponding amount. For this reason, as show in FIG. 9B, when the minimum radius part of the rotor plate 40 reaches the angular position corresponding to the center of the core 22, a gap appears between the core 22 and the rotor plate 40 when viewed from above. Specifically, when the rotor plate 40 is at the rotational position shown in FIG. 9B, the profile line of the rotor plate 40, when viewed from above, does not intersect with the circle (projective circle) of the top face of the core 22, and is spaced apart from the edge of the projective circle of the core 22. The size of the gap depends on the configuration of the core 22 (the radius r, for example), etc, and it is preferable that the size be in the range of 0.3 to 1.2 mm in the radial direction.

When the rotor plate 40 is at the rotational position shown in FIG. 9B, there is a gap, so that the rotor plate 40 does not allow the magnetic flux that would be radiated from the periphery of the core 22 to pass through the rotor plate 40, which makes it possible to maximize the magnetic resistance at this rotational position. By providing such a gap, it is possible to prevent the rotor plate 40 from overlapping the periphery of the core 22 at the rotational position due to the accuracy error of machining and/or assembly of the rotary shaft 42 and the rotor plate 40. Thus, it is possible to obtain a robust output signal that is less prone to be affected by the individual differences. By providing the gap as shown in FIG. 9B at the position where the minimum radius part of the rotor plate 40 is the closest to the periphery of the core 22, it is possible to obtain the stable waveforms of voltages output from the coils that are less prone to be affected by the various accuracy errors of machining and/or assembly while the range of variation of the voltages output from the coils is maximized. In this way, the smooth, less irregular waveforms of voltages output from the coils can be stably obtained, and the accuracy of detecting the rotation angle is significantly improved. It should be noted that the gap is especially useful when the angular multiplication factor is larger than one, which is seven in this embodiment, that is, the profile of the rotor plate 40 has a great unevenness.

Figure 10A:
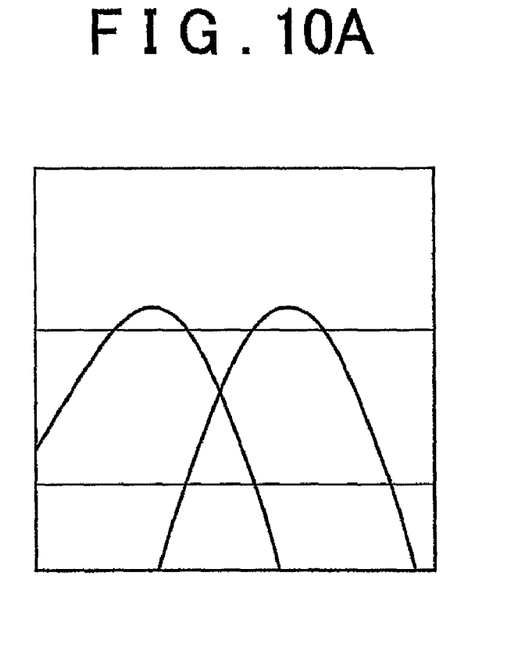
FIGS. 10A and 10B are enlarged views of the region around peaks of the waveforms of the voltages output from the coils.
Figure 10B:
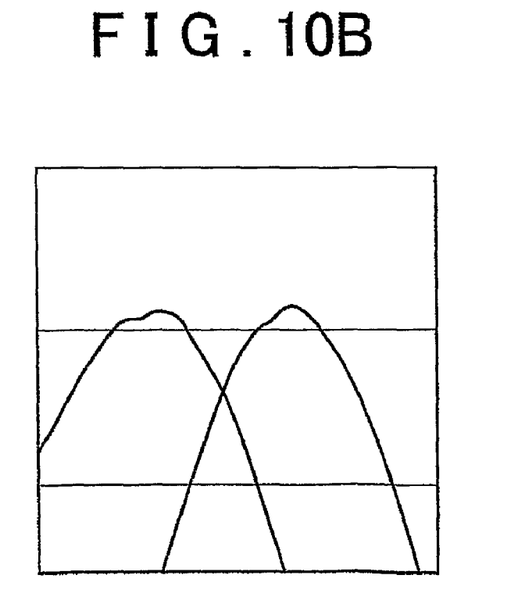

FIGS. 10A and 10B are enlarged views of the region X around peaks of the waveforms of the voltages output from the coils that are shown in FIG. 8. FIG. 10A shows output waveforms obtained when the profile line of the rotor plate 40 is formed according to the curve represented by Y=r{sin N(θ−90°/N)+1} as described above. FIG. 10B shows output waveforms obtained when the profile line of the rotor plate 40 is formed according to the curve represented by Y=a{sin N(θ−90°/N)+1} (where a>r).

It can be seen from FIG. 10A that, if the profile line of the rotor plate 40 is formed according to the curve represented by Y=r{sin N(θ−90°/N)+1}, and the gap is provided as described above, it is possible to stably obtain smooth waveforms of the voltages output from the coils, in which disturbance is small at and near the peaks thereof.

On the other hand, it can be seen that, if the profile line of the rotor plate 40 is formed according to the curve represented by Y=a{sin N(θ−90°/N)+1} (where a>r) instead, although the range of variation of the voltages output from the coils remains at a similar level as compared to the case where the profile line is formed according to the curve represented by Y=r{sin N(θ−90°/N)+1}, disturbance occurs at and near the peaks of the waveforms of the voltages output from the coils. Specifically, when the maximum radius part of the rotor plate 40 reaches the angular position corresponding to the center of the core 22, the waveforms of the voltages output from the coils are disturbed.

As described above, when the function Y, which defines the profile line of the rotor 40, is such that the radius r of the core 22 and the amplitude are equal to each other, and the gap is provided, it is possible to obtain the smooth waveforms of the voltages output from the coils, in which disturbance is small at and near the peaks thereof.

A second embodiment differs from the above-described first embodiment in details of the profile line of the rotor plate 40, etc. The differences in configuration between the second embodiment and the first embodiment, will be mainly described below. Unless otherwise defined, various terms are used in accordance with the definition given in the above description of the first embodiment.

Figure 11:
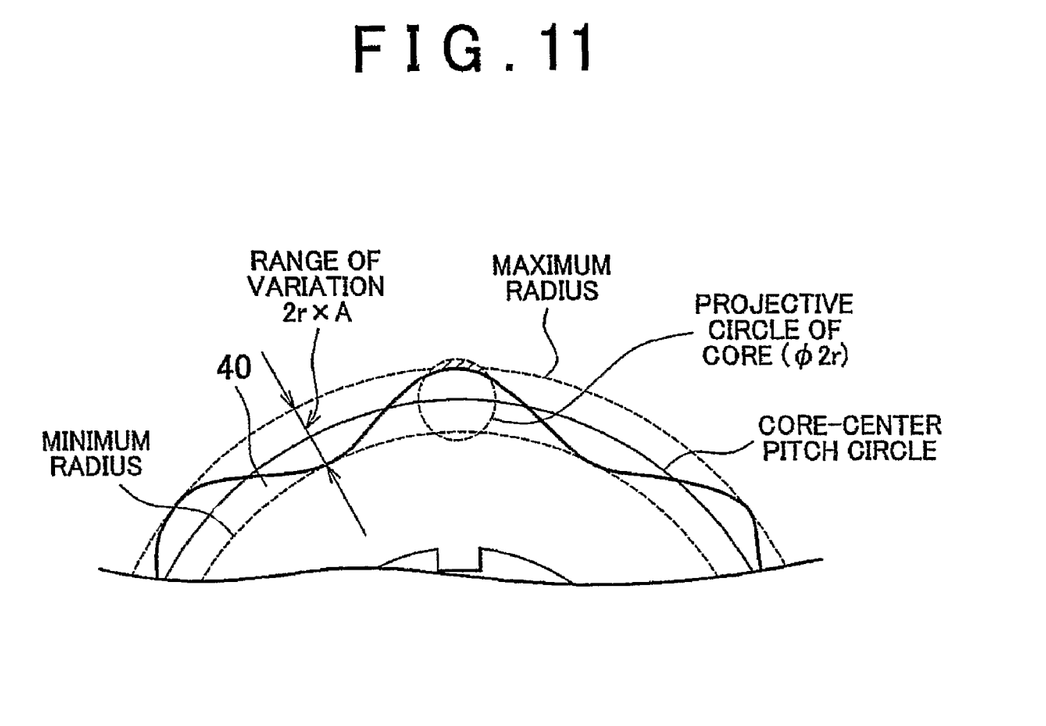
FIG. 11 is a diagram showing a relationship between the rotor plate 40 and a core 22 in a second embodiment.

With regard to the second embodiment, the function Y is represented as follows:

$$Y = A \cdot r \{\sin N(\theta - 90°/N) + 1\}$$

wherein A is a coefficient, and is preferably set within the range of 0.8 to 0.9 as described later. As apparent from this equation, as the rotation angle θ varies, the position of the point on the profile line of the rotor plate 40 on the reference axis varies according to the sine curve of which the amplitude is A·r that is slightly smaller than the radius r of the core 22. Specifically, the range of variation 2 A·r of the profile line of the rotor plate 40 in the radial direction is set smaller than the diameter 2r of the core 22. When the resolver is of 7×, that is, N=7, and r=4 [m], for example, the function Y is represented as follows:

$$Y=4A\{\sin 7(\theta-90°/7)+1\}$$

For the sake of convenience in explanation, the region of the rotor plate 40 between the maximum radius and the minimum radius thereof (the region of which the width in the radial direction is 2 A·r) is referred to as "the profile-varying region," and the circle of which the radius is equal to the minimum radius+A·r is referred to as "the mid-circle of the profile-varying region." In the second embodiment, the positional relationship is set so that the mid-circle of the profile-varying region substantially coincides with the core-center pitch circle.

FIG. 11 is a diagram showing the relationship between the rotor plate 40 and the core 22 in the second embodiment, and is a partial view in which attention is focused on a core 22 of a pole (the explanation of FIG. 11 is given with attention focused on the single core 22). FIG. 11 shows a state in which the profile-varying region covers the top face of the core 22 to the maximum extent.

In the example shown in FIG. 11, the mid-circle of the profile-varying region completely coincides with the core-center pitch circle. Accordingly, when a maximum radius part of the rotor plate 40 reaches the angular position corresponding to the center of the core 22, a peripheral part of the core 22 is positioned further outward from the maximum radius part of the rotor plate 40 in the radial direction by r·(1−A) when viewed from above, as shown in FIG. 11. Similarly, when a minimum radius part of the rotor plate 40 reaches the angular position corresponding to the center of the core 22, although not shown, a peripheral part of the core 22 is positioned further inward of the minimum radius part of the rotor plate 40 in the radial direction by r·(1−A) when viewed from above.

With the second embodiment as described above, although a margin of r·(1−A) in length in the radial direction is provided, and the range of variation of the voltages output from the coils becomes small accordingly, it is possible to essentially eliminate the waveforms of the voltages output from the coils from being disturbed (see FIG. 10B) when the maximum radius part or the minimum radius part of the rotor plate 40 reaches the angular position corresponding to the center of the core 22. In addition, by providing similar margins on both the outer and inner sides in the radial direction, it is possible to effectively absorb the accuracy error of machining and/or assembly of the rotary shaft 42 and the rotor plate 40. Thus, it is possible to obtain a robust output signal that is less prone to be affected by the individual differences.

Although example embodiments of the present invention have been described in detail, the present invention is not limited to the above-described embodiments. Various modifications and substitutions can be made to the above-described embodiments without departing from the scope of the present invention.

For example, although the completely annular coil substrate 30 is used in the above-described embodiments, an annular substrate of one layer may consist of a plurality of separate elements. For example, it is also possible to print the coil portions on two substrates that have a semicircular shape, and then join the two substrates, thereby forming a completely annular coil substrate 30 in the end.

In addition, although, in the embodiments described above, the patterned coils 34 are printed on an insulating substrate, the patterned coils 34 may be formed by any method as long as the patterned coils 34 made of electrically conductive film (thin film) are formed. The patterned coils 34 may be formed by using another printing technology, such as a film transfer method; by disposing and bonding a film, in which a similar coil pattern is formed, on the substrate; or by stamping, vapor deposition, etc. Alternatively, although it may be disadvantageous from the viewpoint of the ease of assembly and the reduction in thickness, the coils corresponding to the patterned coils 34 may be formed around the cores 22 by using wire.

Although, in the above embodiments, the "1-phase input/2-phase output" configuration is adopted, a "1-phase input/1-phase output" configuration may be adopted instead. The particular configuration of the phase is arbitrary.

As described above, the present invention may be used in all kinds of apparatuses that detect the rotation angle of a rotor. Such applications may include rotation angle sensors, for example, that detect the rotation angle of a shaft in a power steering system.

The invention claimed is:

1. A magnetic resolver comprising:
   a stator portion which includes an annular plate having, on a side thereof, a plurality of columnar cores;
   a coil portion disposed around each of the columnar cores; and
   an annular rotor which has an outer periphery having a sinusoidal profile line that rotates in a plane that is parallel to top faces of the columnar cores around a rotation axis that passes through the center of the annular plate, wherein a radius of the rotor varies according to a sine function, an amplitude of the sine function being substantially equal to a radius of the columnar cores,
   wherein the columnar cores are radially disposed between a maximum radius and a minimum radius of the rotor,
   wherein an area by which a top face of the columnar core and the annular rotor overlap when viewed from above, varies as a rotation angle of the annular rotor relative to the stator portion varies, and
   wherein when one of the columnar cores is disposed between two crests of the profile line of the rotor when viewed from above, a gap is formed between the one of the columnar cores and a trough of the profile line.

2. The magnetic resolver according to claim 1, wherein the centers of the columnar cores are located on a concentric circle with the annular rotor at evenly spaced angular positions.

3. The magnetic resolver according to claim 1, wherein the area by which the top face of any one of columnar cores and the annular rotor overlap when viewed from above, varies as the rotation angle of the annular rotor relative to the annular plate varies.

4. The magnetic resolver according to claim 1, wherein the area by which the top face of the columnar core and the annular rotor overlap when viewed from above, varies continuously as the rotation angle of the annular rotor relative to the annular plate varies.

5. The magnetic resolver according to claim 1, wherein in the sine function a rotation angle is a variable and a period is determined by an angular multiplication factor.

6. The magnetic resolver according to claim 5, wherein an amplitude of the sine function is determined based on the radius of the columnar core.

7. The magnetic resolver according to claim 6, wherein a middle position of the profile-varying region coincides with the central axis of the columnar core on the annular plate in the radial direction.

8. The magnetic resolver according to claim 7, wherein the amplitude of the sine function is within a range of 0.8 to 0.9 times the radius of the columnar core.

9. The magnetic resolver according to claim 1, wherein a radial position of a profile-varying region, which is part of the rotor within a range of variation of the radius of the rotor, corresponds to a radial position of the columnar core on the annular plate.

10. The magnetic resolver according to claim 1, wherein the gap is within a range of 0.3 to 1.2 mm in the radial direction.

11. A magnetic resolver according to claim 1, wherein the coil portion is formed of a patterned coil formed on an annular substrate that has a plurality of through holes through which the plurality of cores pass, the patterned coil being formed around the through holes.

12. The magnetic resolver according to claim 11, wherein the substrate on which the coil portions are formed is placed on the annular plate and the cores are passed through the through holes.

13. The magnetic resolver according to claim 11, wherein a plurality of the substrates on each of which the coil portions are formed are stacked.

14. The magnetic resolver according to claim 13, wherein the coil portions of a plurality of phases, including an excitation phase, are provided, and the coil portions of each phase are formed on separate substrates.

15. The magnetic resolver according to claim 14, wherein a plurality of the substrates on each of which the coil portions of the same phase are formed are stacked, and the coil portions of the same phase on the plurality of substrates are electrically connected by using a via hole made in at least one of the plurality of substrates.

16. The magnetic resolver according to claim 11, wherein the patterned coil is formed around the core by using wire.

17. The magnetic resolver according to claim 1, wherein when the gap is formed between the one of the columnar cores and the trough of the profile line, a vertical plane which intersects the two crests of the profile line passes through the one of the columnar cores.

* * * * *